United States Patent [19]

Meuschke et al.

[11] Patent Number: 4,824,632

[45] Date of Patent: Apr. 25, 1989

[54] FUEL ASSEMBLY ALIGNMENT PIN STRAIGHTENING DEVICE

[75] Inventors: Robert E. Meuschke, Penn Hills; Edward P. Shields, N. Huntingdon, both of Pa.

[73] Assignee: Westinghouse Electric Corp., Pittsburgh, Pa.

[21] Appl. No.: 140,175

[22] Filed: Dec. 31, 1987

[51] Int. Cl.$^4$ .................... G21C 19/00; G21C 19/26
[52] U.S. Cl. .................... 376/261; 72/476; 72/702; 140/147
[58] Field of Search ............ 376/261, 260; 140/147; 72/352, 476, 462, 702; 29/723, 400 N, 402.05, 402.19, 34 R, 283.5

[56] References Cited

U.S. PATENT DOCUMENTS

| | | | |
|---|---|---|---|
| 3,542,087 | 11/1970 | Fegley | 140/147 |
| 3,700,011 | 10/1972 | Walter | 140/147 |
| 3,903,937 | 9/1975 | Drummond | 140/147 |
| 4,340,092 | 7/1982 | Chisholm | 140/147 |
| 4,397,341 | 8/1983 | Kent | 140/147 |
| 4,511,976 | 4/1985 | Graf | 72/702 |
| 4,590,671 | 5/1986 | Havoic-Conroy | 376/260 |
| 4,624,042 | 11/1986 | Green | 29/723 |
| 4,627,169 | 12/1976 | Zafred et al. | 33/169 |
| 4,678,625 | 7/1987 | Wilson | 376/261 |
| 4,688,416 | 8/1987 | Shallenberger et al. | 376/261 |
| 4,690,593 | 9/1987 | Nee et al. | 376/260 |
| 4,696,784 | 9/1987 | Tolino et al. | 376/260 |

Primary Examiner—Deborah L. Kyle
Assistant Examiner—Daniel Wasil
Attorney, Agent, or Firm—Michael G. Panian

[57] ABSTRACT

A straightening device (16) for bent fuel assembly alignment pins (12) in an upper core plate (10) comprises elongated mast (22) having an upper and lower portion, bail (25) secured to the upper portion and cross member (28) secured to the lower portion. At one end of the cross member (28) is attached pin straightening assembly (19), the other end having counterweight (31) to assure a horizontal orientation of the cross member (28). Pin straightening assembly (19) is further comprised of housing (37) having wedge-shaped adjustable shim (61) connected to its top surface, the housing (37) secured to the cross member (28) by baseplate (34). Four axially compressible and laterally deformable compression springs (41) are connected between baseplate (34) and housing (37) to provide angular and translational compliance for housing (37). Housing (37) has two vertical holes disposed therein, first hole (50) adapted to receive hardened die insert (54) having bore (55) with frusto-conical opening (56) for receiving bent pin (12), and second hole (51) for receiving another pin (14). Connected to base plate (34) opposite housing (37) is hydraulic ram (44) for moving housing (37) into full planar contact with bottom surface (47) of upper core plate (10) to effectuate the straightening of bent pin (12).

22 Claims, 4 Drawing Sheets

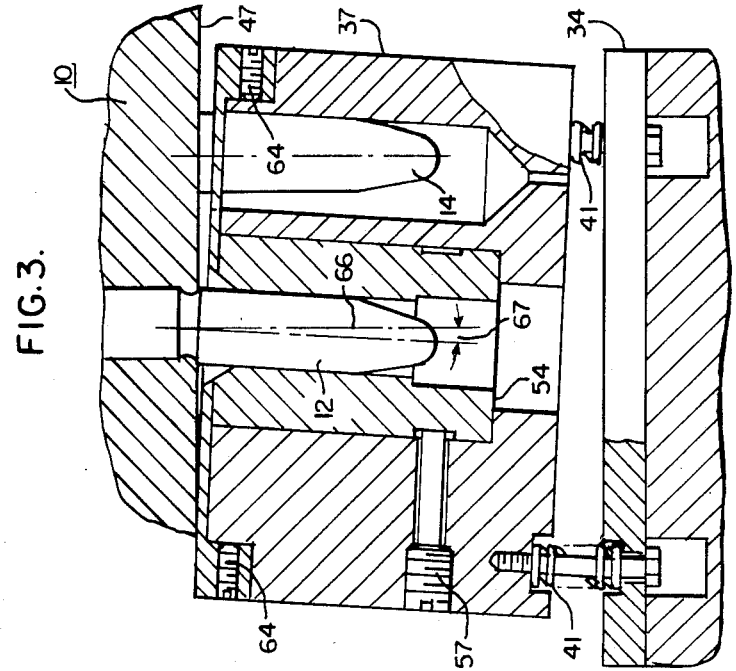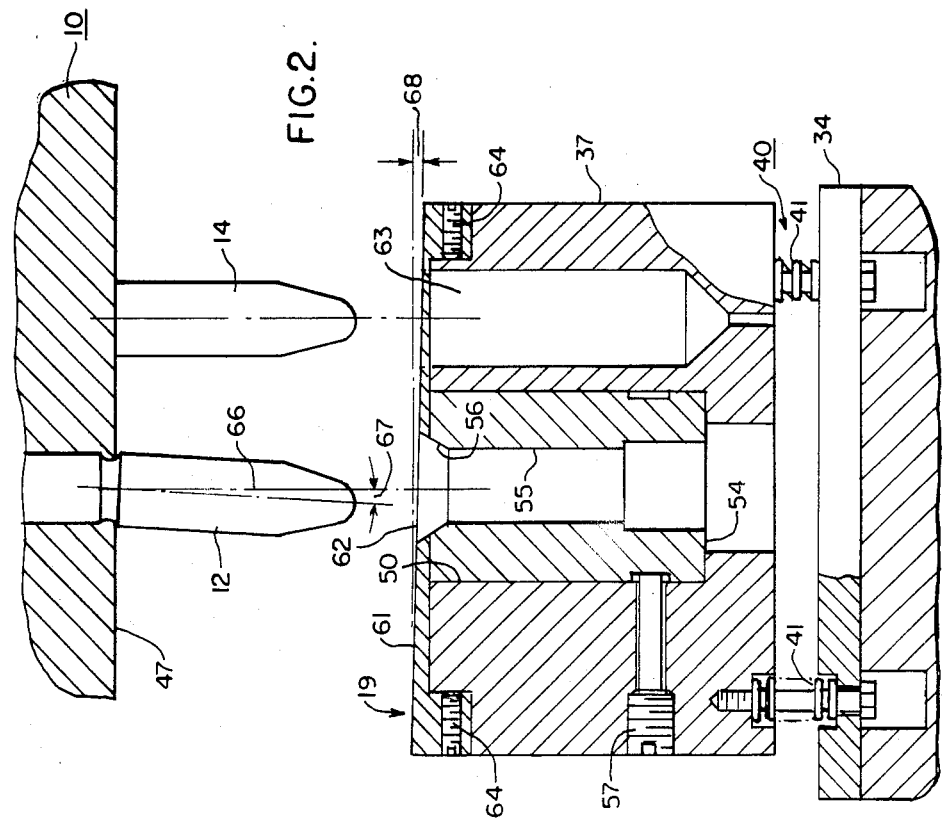

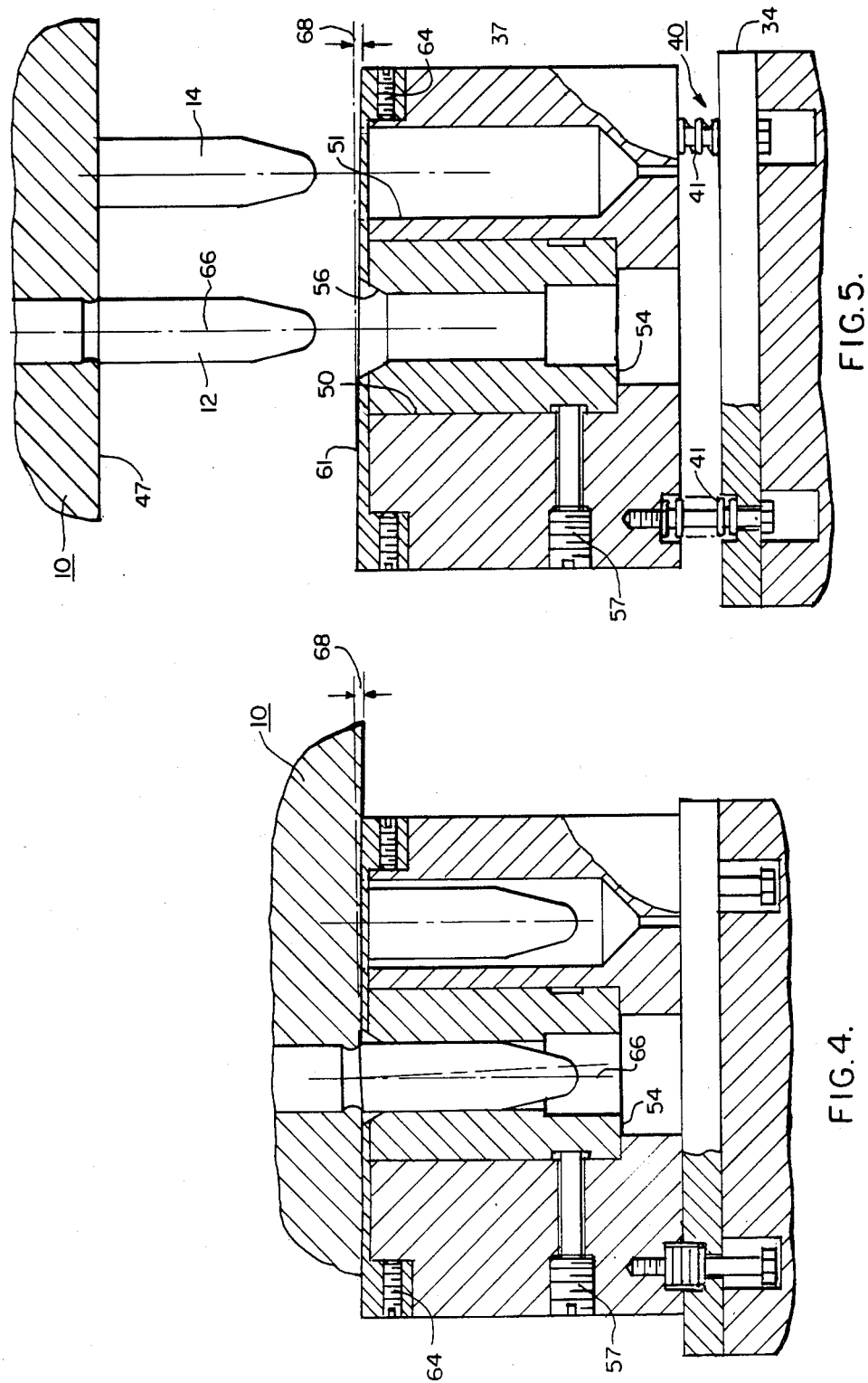

FUEL ASSEMBLY ALIGNMENT PIN STRAIGHTENING DEVICE

TECHNICAL FIELD

The invention relates to nuclear fuel assembly alignment pins, and more particularly to a pin straightener die for remotely straightening bent alignment pins.

BACKGROUND OF THE INVENTION

In a nuclear power plant, individual fuel assemblies within the plant's reactor vessel must be accurately positioned during reactor operation. This is accomplished by a multitude of fuel assembly alignment pins which are part of the reactor vessel internals structures. The fuel assembly alignment pins project from upper and lower core plates of the internals structures. There are four alignment pins for each fuel assembly: two which extend from the upper core plate and two from the lower core plate. These pins are received in corresponding holes within the fuel assembly top and bottom nozzles. These pins also provide a structural support for the fuel assemblies within the reactor vessel. Therefore, fuel assembly alignment pins are an important component of the nuclear reactor internals structures.

Over the years a number of these pins have become bent at various power plants during reactor refueling operations. To remove spent fuel assemblies, the reactor upper internals are removed from the reactor vessel. During refueling, fresh fuel assemblies are loaded into the lower internals structure and then the upper internals are replaced atop the fuel assemblies. This repeated removal and replacement of the internals structures and fuel assemblies has resulted in the inadvertent bending of several fuel assembly alignment pins. Since a main purpose of these pins is to provide precise alignment of fuel assemblies within the reactor core for proper insertion of control rods, for example, a misaligned pin which cannot be received within the top or bottom nozzle of a fuel assembly can lead to extended fuel reload outages.

A solution to this problem has been to remove such bent pins from the upper and lower core plates of the internals prior to refueling and startup of the reactor. Not only is considerable time lost in removing such a bent pin, but also a large analytic and licensing effort is required to justify operation of the reactor without the alignment pin. This is also due in part to the fact that alignment pins provide structural support for fuel assemblies. Such procedures can result in a high cost for the nuclear reactor power plant operators. Whereas the removal of only a relatively small number of pins may be acceptable, the removal of many such pins cannot be justified. What is needed then, is a way to bring a bent pin back into proper alignment. And since these are irradiated components, such procedures should be capable of remote operation so as to minimize man-rem exposure.

There exists in the prior art various methods and apparatuses for straightening an array of terminal pins or leads of electronic connectors or circuit boards, examples of which are U.S Pat. Nos. 3,700,011 to Walter, 4,397,341 to Kent, and 4,340,092 to Chisholm. The basic method taught by each of these patents is to bend or twist the pins in a reciprocating manner in orthogonal directions, beyond the pins' elastic limit, in order to straighten an array of terminal pins. Since these pins are very small, having a usually square cross-section of only 0.635 mm (0.025 inch), and are made of a soft resilient material, e.g. half-hard brass or copper, it is very easy to straighten terminal pins by such methods. Another characteristic of these prior art methods and apparatuses is that as many terminal pins are straightened simultaneously as possible. Typically, as many as 10,000 terminal pins are inserted in a single circuit board, on a grid spacing of 3.175 mm (0.125 inch). Thus, such methods do not require a very large device to simultaneously straighten numerous terminal pins. Furthermore, due to such close spacing, it is very difficult to individually detect and straighten a single misaligned pin. Therefore, since terminal pins are resilient, it is far easier to simultaneously manipulate all such pins whether or not they require straightening, than it is to seek out and straighten only those pins which are actually bent.

Whereas such methods and apparatuses are quite capable of correctly aligning circuit board terminal pins, they are not suitable for straightening bent fuel assembly alignment pins. By way of example only, reference is made to a four-loop Westinghouse pressurized water reactor. Firstly, one design of such a pressurized water reactor has an internal diameter, having corresponding upper and lower core support plates on which the fuel assembly alignment pins are located, of about 3000 mm (10 feet). Secondly, there are on the order of 200 fuel assemblies in such a reactor vessel, resulting in about 400 alignment pins in each of the upper and lower core support plates. Finally, fuel assembly alignment pins for such a reactor design are typically made of stainless steel having a diameter of about 22 mm (or less than 1 inch), which does not lend itself to easy bending or twisting. Hence, it would not be advantageous to attempt to simultaneously straighten substantially all of the alignment pins, particularly since only a relatively small number of pins, if any, are bent.

It is therefore an object of the present invention to provide a device to accurately straighten bent fuel assembly alignment pins.

It is a further object of the present invention to provide such a device which is capable of remote operation.

It is a still further object of the present invention to provide a device which can accurately straighten bent fuel assembly alignment pins in various nuclear power plants having non-uniform refueling cavities.

DISCLOSURE OF THE INVENTION

The above objects are obtained by the present invention, according to which, briefly stated, a straightening device for bent fuel assembly alignment pins in a nuclear reactor comprises an elongated mast having secured to its lower portion a cross member, and a supporting means attached to its upper portion. The cross member is generally perpendicularly disposed to the elongated mast and has at one of its ends a pin straightening means. The pin straightening means or assembly is comprised of a housing having two parallel holes disposed therein; a die insert being secured within one hole, the insert adapted to receive a bent fuel assembly alignment pin. A wedge-shaped adjustable shim forms an upper surface of the die housing. A means interconnecting the housing with a baseplate, which is adapted to secure the straightening means to the cross member, said interconnecting means providing both angular and translational compliance for the housing. On an opposite end of the baseplate is secured a means for moving the adjustable shim into contact with the upper core plate bottom surface, which action performs the straightening of the bent fuel assembly alignment pin.

BRIEF DESCRIPTION OF THE DRAWINGS

The invention will become more apparent by reading the following detailed description in conjunction with the following drawings, which are shown by way of example only, wherein:

FIG. 2 is an enlarged, side plan view of the straightening means of the present invention placed under two pins;

FIG. 3 is a view of the straightening means being positioned over a bent fuel assembly alignment pin, showing the device's compliance;

FIG. 4 is a view of the straightening means after it has been fully extended over the pins;

FIG. 5 is a view of the same two fuel assembly alignment pins, the bent pin having been straightened by the device of the present invention.

DESCRIPTION OF THE PREFERRED EMBODIMENT

Figure 1:
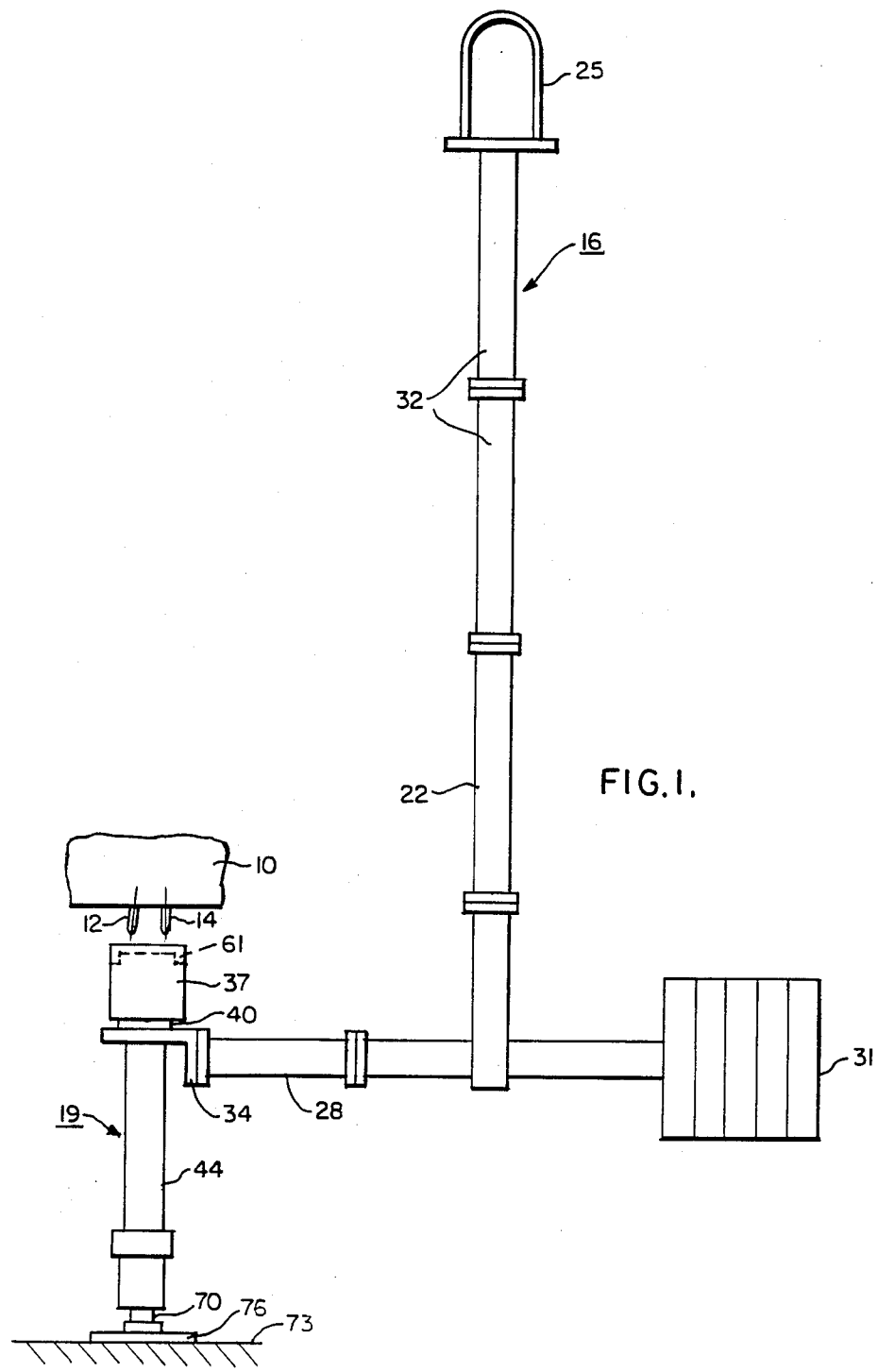
FIG. 1 is a front, elevational view of a straightening device for a fuel assembly alignment pin according to the present invention.

Referring now to the drawings in detail, FIGS. 1 and 2 show a partial section of a nuclear reactor upper core plate 10 with two fuel assembly alignment pins, one misaligned or bent 12 and the other relatively straight 14. FIG. 1 shows the straightening device, generally designated at 16, which has been positioned by a refueling machine auxiliary hoist (not shown) so as to place the straightening means, generally designated at 19, under the upper core plate 10. The upper core plate 10, and the upper internals structure of which it is a part, is supported for this purpose, outside of the reactor vessel, upon a support structure (not shown) within a refueling cavity of the containment area of a nuclear power plant.

The straightening device 16 generally comprises an elongated mast 22 having a bail 25, or other support means, secured to its top end and a cross member 28 secured to the bottom end, generally perpendicularly disposed to the elongated mast 22. Secured to one end of the cross member 28, the left hand side of FIG. 1, is the straightening means 19. On the opposite end of the cross member 28 is a counterweight 31 matched to the weight of the straightening means 19 (which in this example is about 295 kg or 650 lbs.) so as to keep the cross member 28 horizontal in a generally perpendicular orientation with respect to the elongated mast 22. Preferably, the elongated mast 22 is comprised of a plurality of segments 32. Since plants have differing sized containment buildings, the use of segments 32 having different lengths allows the straightening device 16 to be used in a number of different plants. The cross member 28 would also be made of segments so that the straightening means 19 can reach all fuel assembly alignment pins regardless of their radial position on the upper or lower core plate 10. These segments may either be rigidly secured end to end, or may be telescoping. The device 16 is supported and positioned by the bail 25 by means of the plant's overhead crane (not shown).

The straightening means or assembly 19 is secured to the cross member 28 by a baseplate 34, and generally comprises a housing 37, a means 40 of interconnecting said housing 37 with said baseplate 34 for providing both angular and translational compliance for the housing 37, as shown in FIG. 3. Preferably, the interconnecting means 40 is comprised of four axially compressible and laterally deformable compression springs 41 connected between the housing 37 and the baseplate 34. Also secured to the baseplate 34, on a side opposite the housing 37, is a hydraulic ram 44 or other means for lifting the housing 37 into full planar contact with a bottom surface 47 of the upper core plate 10.

Shown in greater detail in FIG. 2, the housing 37 of the pin straightening assembly 19 has two generally parallel vertical holes 50 and 51 disposed therein. A die insert 54 is adapted to be secured within a first hole 50, the die insert 54 also having a bore 55 disposed therein for receiving a bent fuel assembly alignment pin 12. Preferably, the bore 55 has a frusto-conical opening 56 to facilitate the entry of the bent pin 12 into the bore 55 of the die insert 54. The die insert 54 is secured to the housing 37 by a set screw 57. Also, the die insert 54 is preferably made of a hardened material, most preferredly 17-4 ph stainless steel, to prevent its deformation as the pin 12 is bent back into alignment. The other bore 51 is adapted to receive. the other pin 14 and is an aid to alignment of the housing 37 with respect to the upper core plate 10. The bore 51 is of a diameter which is greater than that of the fuel assembly alignment pin 14 to allow compliance of the housing 37 as the bent pin 12 is inserted into the die insert 54. This is especially true if the other pin 14 happens to be misaligned as well. A most important feature of the straightening assembly 19 is a wedge-shaped adjustable shim 61 disposed on an upper surface of the housing 37. The shim 61 also has two holes 62 and 63 which are concentric with the two holes 50 and 51 in the housing 37. The shim 61 is a plate which is secured to the top of the housing 37 by set screws 64.

The purpose of the adjustable shim 61 is to compensate for expected spring back in the pin 12. This is accomplished by bending the pin 12 a predetermined amount past a centerline, generally designated at 66, which corresponds to a correct alignment of the bent pin 12 (see FIG. 4). For a typical stainless steel pin, having a diameter of about 22 mm, the pin 12 should be bent past the centerline 66 at an angle which is about 15% to 25%, and preferably about 20%, greater than and opposite to an angle at which the pin 12 was originally bent. For example, if the pin 12 were misaligned at an angle 67 of 3°, the adjustable shim 61 would have an included angle 68 of about 3.6°. (The predetermined angle at which the pin 12 is bent back beyond the original centerline 66 is dependent upon the material of the pin 12). At this value the spring back of the pin 12 will cause it to align exactly with the desired centerline 66, after the straightening assembly 19 is lowered from the upper core plate 10 and out of engagement with the pins 12 and 14 (FIG. 5). Alternatively, the hardened die insert 54 may have a bore 55 which is slanted at an angle opposite to that of the bent pin 12 in order to compensate for spring back in the pin 12, instead of using an adjustable shim 61. This included angle for the adjustable shim 61 or die insert 54 mainly is a function of the material of which the alignment pin 12 is constructed. The angle which will adequately compensate for expected springback of a pin 12 can thus be functionally derived for whatever material the pin 12 is constructed.

When a bent pin 12 is discovered, its angle of misalignment 67 is determined. This can be accomplished either by the use of high resolution photography to determine bend angles and direction, or by making a mold of the bent pin 12. In the second method, a putty-like substance is applied to the bent pin 12, and allowed to harden. The mold is then removed and the angle 67 and direction of bent pin 12 measured. An adjustable shim 61 is then chosen which has an included angle which is about 20% greater than and opposite to the misalignment angle 67. The straightening procedure, as shown in FIGS. 2-5, is then performed. The plant's auxiliary hoist (not shown) maneuvers the straightening device 16 so that the straightening assembly 19 is generally placed under the upper core plate 10 in an area in which a bent pin 12 is situated. The device 16 is suspended by the hoist by the bail 25. The length of the elongated mast 22 is dependent upon the height of the hoist above the refueling cavity, and the length of the cross member 28 is dependent upon the radial position of the bent pin 12: the closer the pin 12 is to the centerline of the reactor upper internals, the longer the cross member 28 must be. Also, the orientation of the pin 12 determines the orientation of the shim 61 on the housing 37. More exact positioning of the housing 37 and the die insert 54 therein under the bent pin 12 is accomplished by means of remote television cameras (not shown) positioned under the upper core plate 10. When the housing 37 is so positioned (FIG. 2), the hoist lifts the device 16 such that the bent pin 12 enters the bore 55 of the insert 54 (FIG. 3), until the shim 61 contacts the bottom surface 47 of the upper core plate 10.

At this time, the hydraulic ram 44 is activated so that piston 70 moves downward into contact with the reactor containment refueling cavity floor 73. In order to protect the floor 73, a block 76 may be placed between the piston 70 and the floor 73. This action forces the ram 44, and the attached baseplate 34 upward. This continues until the springs 41 of the compliant interconnecting means 40 are compressed, thereby forcing the housing 37 and the adjustable shim 61 into full planar contact with the upper core plate 10 (FIG. 4). As the baseplate 34 and housing 37 are forced upward the pin 12 is thus bent back in an opposite direction, past the original centerline 66. To accomplish this, in this example, the ram 44 is activated to a force of about 267 kN (60,000 lbs), which is just below that necessary to lift the internals structure out of its support; although all that is necessary to straighten the bent pin 12 is the force required to bring the housing 37 into full planar contact with the upper core plate 10, by activating the ram 44 to this level such full planar contact is assured.

At this point, the ram 44 is deactivated in order to remove the insert 54 out of engagement with the pin 12. When the housing 37 is fully retracted, the pin 12 will spring back a predetermined amount necessary to correctly align the pin 12 with the original designed centerline 66 (see FIG. 5). The device 16 can then be maneuvered to perform the above procedures on any other bent fuel assembly alignment pin.

DESCRIPTION OF A SECOND EMBODIMENT

Figure 6:
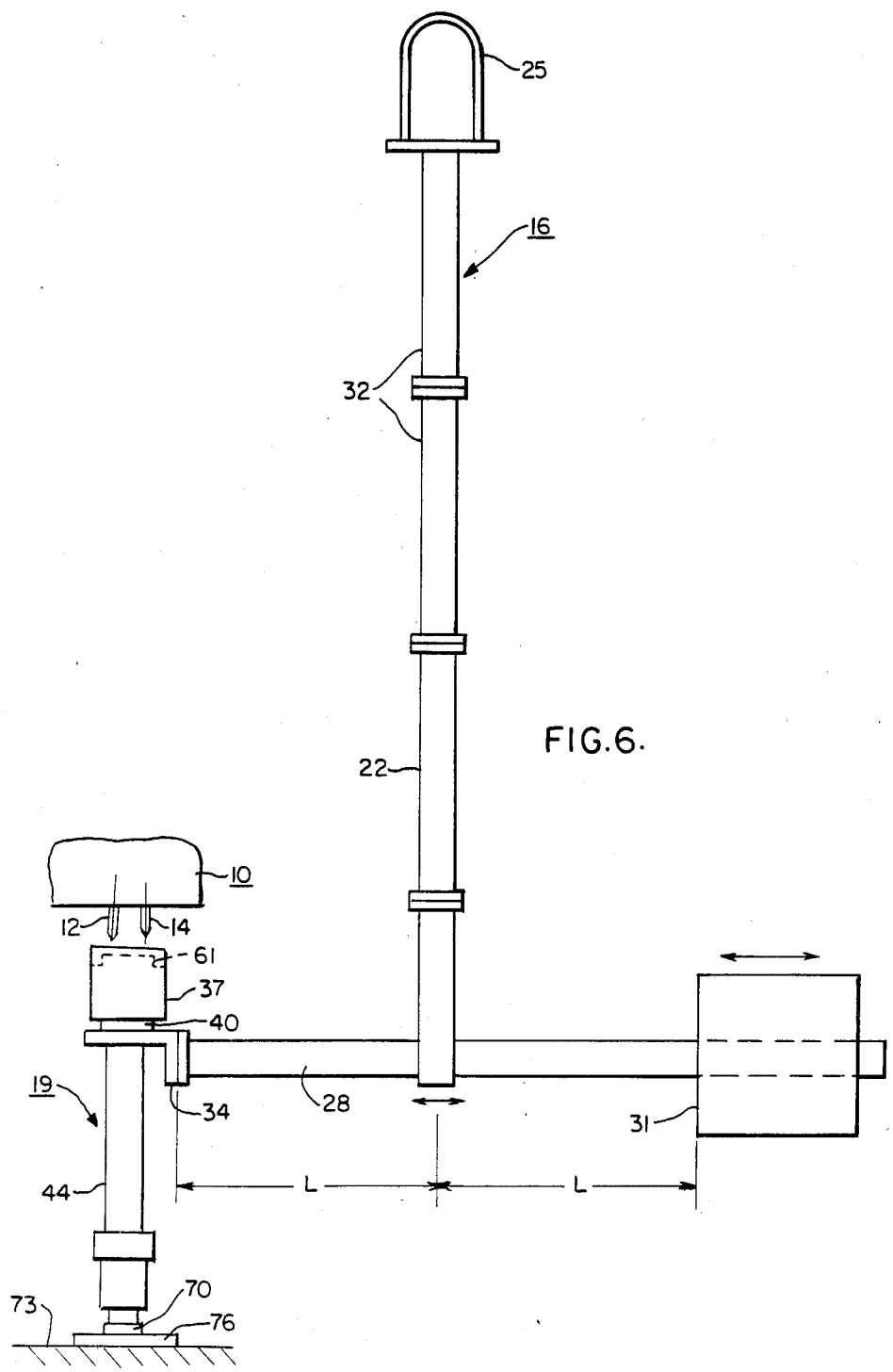
FIG. 6 is a front, elevational view of a second embodiment of a straightening device for a fuel assembly alignment pin.

Instead of the cross member 28 being comprised of sectional members, it is made of a single elongated boom. The boom would be capable of reaching alignment pins 12, 14 in a number of different plants, regardless of the diameter of the reactor internals structures. Also, the mass of the counterweight 31 is capable of remote adjustment. In this configuration, the transverse position of the elongated mast 22 between the pin straightening assembly 19 and the counterweight 28 on the elongated boom or cross member 28 is also remotely adjustable (FIG. 6). This can be accomplished by any suitable means known in the art, preferably by an electric motor and an associated encoder which would indicate the position of the mast 22 with respect to the cross member 28. In this manner the effective length, L, of the cross member 28 can be remotely adjustable.

Since the radial positions of each of the alignment pins is known, the individual size and mass of each of the counterweight 31 members are chosen to balance the cross member 28 as the straightening assembly 19 is positioned under a respective bent alignment pin 12. For example, each set of pins 12, 14 occupies a fixed radial (and linear) position on the reactor internals. The maximum mass of the counterweight 31 is placed on the end of the cross member 28, and the mast 22 remotely positioned at a point on the cross member nearest the counterweight in order to reach those alignment pins which are innermost on the diameter of the reactor internals. As each radial (or linear) row of pins is remotely inspected by television cameras (not shown), the straightening assembly 19 can be positioned thereunder for straightening any bent pins 12 discovered. When such operation is completed for those innermost pins, the mast 22 is then moved to a position on the cross member 28 in order that the straightening assembly 19 can be positioned under the next group of pins; the appropriate weight would be removed from the counterweight 31 to balance the cross member 28. This operation would be repeated until each of the pins 12, 14 has been inspected and, if necessary, straightened. Alternatively, the counterweight 31 can be slidably mounted on the cross member 28, the counterweight not being adjustable, in order to compensate for the bending moment on the cross member 28 produced by the straightening assembly 19. Thus, the mast 22 would always be positioned midway between the straightening assembly 19 and the counterweight. It is also to be understood that the orientation and angle 68 of the adjustable shim 61 (or die insert 54) would be capable of remote adjustment to be able to straighten any bent pin 12, regardless of its misalignment angle 67.

Another advantage to this type of arrangement is that the inspecting and straightening of fuel assembly alignment pins can be completed much more quickly. Instead of having to first inspect the reactor internals in order to map the locations of any bent pins to provide for predetermined parameters for the tool 16, the inspecting and straightening procedures can be simultaneously performed. This even further would reduce refueling downtime, as well as reducing individual man-rem exposure for plant maintenance personnel.

Although the embodiments discussed refer to vertical pins which project upward or downward from a horizontal wall, it is to be understood that the device may be also used to straighten pins, or other such members, which project horizontally from a vertical wall.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A straightening device for bent fuel assembly alignment pins in a nuclear reactor, said device comprising:
   (a) an elongated mast having an upper and lower portion;
   (b) a cross member secured to the lower portion, generally perpendicularly disposed to the elongated mast;
   (c) a means for supporting the mast secured to the upper portion; and
   (d) a means secured to one end of the cross member for engaging and straightening said alignment pins, said straightening means being comprised of:
       i. a housing having two generally parallel holes disposed therein;
       ii. a die insert adapted to be secured within one of said holes, said insert having a bore disposed therein for receiving a bent fuel assembly alignment pin;
       iii. means of compensating for spring back of a pin being straightened, such that said bent pin is bent back a predetermined amount past its original centerline;
       iv. a baseplate adapted to secure said straightening means to the cross member;
       v. means for interconnecting said housing with said baseplate for providing both angular and translational compliance for the housing; and
       vi. means for moving said straightening means secured to the baseplate opposite the housing whereby a bent alignment pin is straightened.

2. The straightening device of claim 1, wherein the compensating means is comprised of a wedge-shaped adjustable shim disposed on an upper surface of the housing, said shim having two holes therethrough which are concentric with the two holes disposed in the housing.

3. The straightening device of claim 1, wherein the interconnecting means is comprised of at least one axially compressible and laterally deformable element connected between the housing and the baseplate.

4. The straightening device of claim 3, wherein the element is a compression coil spring.

5. The straightening device of claim 1 wherein the interconnecting means is comprised of four axially compressible and laterally deformable compression springs connected, between the housing and the baseplate.

6. The straightening device of claim 3, wherein one of said two holes in said shim concentric with the die insert bore has a frusto-conical opening.

7. The straightening device of claim 1, wherein the elongated mast is comprised of a plurality of segments.

8. The straightening device of claim 1, wherein the support means is adapted to be suspended from an associated support mechanism.

9. The straightening device of claim 1, further comprising a counterweight secured to the cross member at an end opposite the pin straightening means.

10. The straightening device of claim 1, wherein the means for moving said straightening means is a hydraulic ram.

11. The straightening device of claim 2, wherein the wedge-shaped adjustable shim has an included angle which will compensate for spring back in the pin after it is brought back into alignment.

12. The straightening device of claim 11, wherein the wedge-shaped adjustable shim has an included angle which is about 15% to 25% greater than an angle at which the bent alignment pin is oriented.

13. The straightening device of claim 12, wherein the wedge-shaped adjustable shim has an included angle which is 20% greater than the bent an angle at which an alignment pin is oriented.

14. The straightening device of claim 1, wherein the cross member is comprised of a plurality of segments.

15. The straightening device of claim 1, wherein the compensating means comprises a die insert having a bore disposed therein for receiving a bent fuel assembly alignment pin, said bore being disposed at an angle which will compensate for spring back in the pin after it is brought back into alignment.

16. The straightening device of claim 1, wherein the effective length of the cross member is remotely adjustable.

17. A device for straightening bent fuel assembly alignment pins which project from a bottom surface of a nuclear reactor upper core plate, said device comprising:
   an elongated mast including a plurality of segments, said mast having an upper and lower portion;
   a support bail secured to the upper portion;
   a cross member comprising at least one segment secured to the lower portion and generally perpendicularly disposed to the elongated mast;
   a pin straightening assembly secured to one end of said cross member, said assembly further comprising:
   (a) a housing having a top and bottom surface, said housing further having two vertical generally parallel holes disposed therein, a first hole adapted to receive an insert, and a second hole which has an internal diameter substantially greater than that of a fuel assembly alignment pin;
   (b) a die insert made of hardened material, having a bore disposed therein, said insert adapted to be secured within the first hole;
   (c) a wedge-shaped shim adapted to be received on the top surface of the housing, said shim also having two holes therethrough such that the two holes are concentric with the two vertical holes of the housing;
   (d) a baseplate adapted to secure the pin straightening assembly to the cross member;
   (e) a plurality of axially compressible and laterally deformable compression springs connected between the housing and the baseplate, whereby the housing is provided with both angular and translational compliance; and
   (f) a hydraulic ram connected to the baseplate opposite the housing, said ram adapted to lift the shim on the top surface of the housing into full planar contact with the bottom surface of the upper core plate whereby a bent pin is received in the bore of the hardened die insert and straightened and a generally straight pin is received within the second hole.

18. The straightening device as recited in claim 17, wherein the wedge-shaped shim has an included angle which is about 15% to 25% greater than and opposite to an angle at which the bent pin is oriented.

19. The straightening device as recited in claim 17, wherein there are four axially compressible and laterally deformable compression springs.

20. The straightening device as recited in claim 17, wherein the bore has a frusto-conical opening.

21. The straightening device as recited in claim 20, wherein one of the two holes in the shim concentric with the first hole of the housing has a frusto-conical shape corresponding to that of the bore in the die insert.

22. The straightening device of claim 17, wherein the wedge-shaped adjustable shim has an included angle which is 20% greater than and opposite to an angle at which an alignment pin is bent.

* * * * *